(12) United States Patent
Puxty et al.

(10) Patent No.: US 9,776,127 B2
(45) Date of Patent: Oct. 3, 2017

(54) REVERSIBLE LIGHT DRIVEN GAS ABSORBENT SOLUTION AND PROCESS

(71) Applicant: Commonwealth Scientific and Industrial Research Organisation, Campbell, Australian Capital Territory (AU)

(72) Inventors: Graeme Puxty, Holmesville (AU); Paul Feron, Floraville (AU); Robert Bennett, Hamilton North (AU)

(73) Assignee: Commonwealth Scientific and Industrial Research Organisation (AU)

( * ) Notice: Subject to any disclaimer, the term of this patent is extended or adjusted under 35 U.S.C. 154(b) by 102 days.

(21) Appl. No.: 14/907,031

(22) PCT Filed: Aug. 1, 2014

(86) PCT No.: PCT/AU2014/000778
§ 371 (c)(1),
(2) Date: Jan. 22, 2016

(87) PCT Pub. No.: WO2015/013755
PCT Pub. Date: Feb. 5, 2015

(65) Prior Publication Data
US 2016/0158690 A1 Jun. 9, 2016

(30) Foreign Application Priority Data

Aug. 2, 2013 (AU) ................. 2013902894

(51) Int. Cl.
*B01D 53/86* (2006.01)
*B01D 53/40* (2006.01)
(Continued)

(52) U.S. Cl.
CPC ..... *B01D 53/1493* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| 4,636,561 A | 1/1987 | Hosoda |
| 5,185,390 A | 2/1993 | Fischer et al. |

(Continued)

FOREIGN PATENT DOCUMENTS

| EP | 0 277 639 A2 | 8/1988 | |
| JP | 2010-207770 | * 9/2010 | ............. Y02C 10/06 |

(Continued)

OTHER PUBLICATIONS

International Search Report for International Patent Application No. PCT/AU2014/000778 (dated Sep. 15, 2014).

(Continued)

*Primary Examiner* — Daniel Berns
(74) *Attorney, Agent, or Firm* — Merchant & Gould P.C.

(57) ABSTRACT

The invention relates to a process for removing a target gas from a gas stream rich in the target gas and to an absorbent solution for absorbing a gas, such as carbon dioxide, from a gas stream. The invention involves the use of a photoactive compound that is convertible from a first state to a second state upon irradiation to facilitate removal or collection of a target gas from a gas stream.

20 Claims, 9 Drawing Sheets

(51) Int. Cl.
| | |
|---|---|
| *B01D 53/50* | (2006.01) |
| *B01D 53/52* | (2006.01) |
| *B01D 53/56* | (2006.01) |
| *B01D 53/60* | (2006.01) |
| *B01D 53/62* | (2006.01) |
| *B01D 53/68* | (2006.01) |
| *B01D 53/77* | (2006.01) |
| *B01D 53/78* | (2006.01) |
| *B01D 53/14* | (2006.01) |
| *B01D 53/96* | (2006.01) |

(52) U.S. Cl.
CPC ..... *B01D 53/1481* (2013.01); *B01D 53/1487* (2013.01); *B01D 2252/2041* (2013.01); *B01D 2252/20405* (2013.01); *B01D 2252/20421* (2013.01); *B01D 2252/20426* (2013.01); *B01D 2252/20431* (2013.01); *B01D 2252/20442* (2013.01); *B01D 2252/20484* (2013.01); *B01D 2252/20489* (2013.01); *B01D 2252/20494* (2013.01); *B01D 2252/60* (2013.01); *B01D 2252/602* (2013.01); *B01D 2257/20* (2013.01); *B01D 2257/302* (2013.01); *B01D 2257/304* (2013.01); *B01D 2257/404* (2013.01); *B01D 2257/504* (2013.01); *Y02C 10/06* (2013.01)

(56) References Cited

U.S. PATENT DOCUMENTS

| | | | |
|---|---|---|---|
| 5,879,592 | A | 3/1999 | Kumar |
| 6,211,374 | B1 | 4/2001 | Ippoliti |
| 6,549,327 | B2 | 4/2003 | Foucher et al. |
| 7,588,878 | B2 | 9/2009 | Iftime et al. |
| 2011/0116997 | A1 | 5/2011 | Attalla et al. |
| 2013/0192978 | A1 | 8/2013 | Liao |
| 2013/0291724 | A1 | 11/2013 | Meuleman et al. |

FOREIGN PATENT DOCUMENTS

| | | |
|---|---|---|
| JP | 2010-207770 A | 9/2010 |
| JP | 2013-017929 A | 1/2013 |
| WO | WO 03/061862 A1 | 7/2003 |
| WO | WO 2011/020928 A2 | 2/2011 |
| WO | WO 2013/072906 A2 | 5/2013 |
| WO | WO2014/015383 * | 1/2014 ............ B01D 53/02 |

OTHER PUBLICATIONS

Bao et al., "On/Off states of a microbial fuel cell controlled by an optical switching system", *RCS Advances*, 4: 27277-27280 (2014).
Berkovic et al., "Spiropyrans and Spirooxazines for Memories and Switches", *Chem. Rev.*, 100: 1741-1753 (2000).
Chen et al., "Photochromic properties of a water-soluble methyl carboxylic acid indolylfulgimide", *Photochem. Photobiol. Sci.*, 10: 1023-1029 (2011).
Fernandes et al., "Investigations of primary and secondary amine carbamate stability by [1] HNMR spectroscopy for post combustion capture of carbon dioxide", *J. Chem. Thermodynamics*, 54: 183-191 (2012).
Fernandes et al., "Protonation constants and thermodynamic properties of amines for post combustion capture of $CO_2$ ", *J. Chem. Thermodynamics*, 51: 97-102 (2012).
Goldberg et al., "Thermodynamics of Solution of $SO_2$ (g) in Water and of Aqueous Sulfur Dioxide Solutions", *J. Research of the National Bureau of Standards*, 90(5): 341-358 (1985).
Johns et al., "Visible-Light-Responsive Reversible Photoacid Based on a Metastable Carbanion", *Chem. Eur. J.*, 20: 689-692 (2014).
Luo et al., "Visible light mediated killing of multidrug-resistant bacteria using photoacids", *J. Mater. Chem. B.*, 1: 997-1001 (2013).
Matsuda et al., "Diarylethene as a photoswitching unit", *J. Photochem and Photobiol. C*, 5: 169-182 (2004).
Nunes et al., "Photoacid for Extremely Long-Lived and Reversible pH-Jumps", *J. Am. Chem. Soc.*, 131: 9456-9462 (2009).
Puxty et al., "A simple chemical model to represent $CO_2$ -amine-$H_2$O vapour-liquid-equilibria", *International J. Greenhouse Gas Control*, 17: 215-224 (2013).
Shi et al., "Long-Lived Photoacid Based upon a Photochromic Reaction", *J. Am. Chem. Soc.*, 133: 14699-14703 (2011).
Shirai et al., "Photoacid and Photobase Generators: Chemistry and Applications to Polymeric Materials", *Prog. Polym. Sci.*, 21: 1-45 (1996).
Tolbert et al., "Excited-State Proton Transfer: From Constrained Systems to "Super" Photoacids to Superfast Proton Transfer", *Acc. Chem. Res.*, 35: 19-27 (2002).
Yokoyama, "Fulgides for Memories and Switches", *Chem. Rev.*, 100: 1717-1739 (2000).

* cited by examiner

REVERSIBLE LIGHT DRIVEN GAS ABSORBENT SOLUTION AND PROCESS

This application is a U.S. National Stage Application under 35 U.S.C. §371 of International Patent Application No. PCT/AU2014/000778 filed 1 Aug. 2014, which claims the benefit of priority to Australian Patent Application No. 2013902894 filed 2 Aug. 2013, the disclosures of all of which are hereby incorporated by reference in their entireties. The International Application was published in English on 5 Feb. 2015 as WO 2015/013755. To the extent appropriate, a claim of priority is made to each of the above disclosed applications.

FIELD

The present invention is directed to a process for removing a target gas from a gas stream and to an absorbent solution for absorbing a gas, such as carbon dioxide, from a gas stream.

BACKGROUND

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

Waste gas emissions are of significant concern, and the presence of certain gaseous constituents in a waste gas stream can result in air pollution. There is significant research into methods for treating waste gas streams to remove these gaseous constituents from waste gas streams. Carbon dioxide ($CO_2$) emissions, in particular, attract a great deal of attention and the discussion of waste gas emissions that follows will largely be in respect of carbon dioxide. However, the skilled addressee will appreciate that much of this discussion is also applicable to other waste gases.

Emissions of $CO_2$ from combustion processes are recognised as the single biggest contributor to the problem of excessive greenhouse gas concentrations in the atmosphere. One method of reducing atmospheric $CO_2$ emissions is through its capture and subsequent storage in geological or deep sea reservoirs. Capture can be done either from a concentrated point source, such as a fossil fuel power station gas stream (post-combustion capture), or from the atmosphere directly (air capture).

The process for capturing $CO_2$ is termed carbon capture and storage (CCS). In CCS, the $CO_2$ is first separated from a gas mixture typically containing nitrogen, oxygen and possibly other gases using a suitable solvent in a gas-liquid contactor. The contactor may be a packed column, membrane, bubble column or other suitable device. The $CO_2$ is then removed from the solvent in a regeneration process producing pure $CO_2$, thus allowing the solvent to be reused. The $CO_2$ is then liquefied by compression and cooling, with appropriate drying steps to prevent hydrate formation. The liquefied $CO_2$ is transported to a storage site such as a depleted oil or gas reservoir or deep saline aquifer where it is injected for geological storage.

$CO_2$ is an acid gas. That is, upon dissolution in water it forms an acid (carbonic acid). As a consequence typical solvents for the reversible capture and release of $CO_2$ are solutions of weak bases such as amines and/or carbonates. Weak bases allow absorbed $CO_2$ to be released by heating due to a combination of reduced gas solubility and reduced basicity at elevated temperature. Strong bases such as hydroxide are superior in terms of $CO_2$ absorption, however they do not allow for release of the absorbed $CO_2$.

Aqueous amine solutions and alkanolamine solutions in particular, have been investigated extensively as solvents for $CO_2$ capture. As well as being weak bases many amines also have the favourable property of reacting rapidly with $CO_2$. Once dissolved into the amine solution, the aqueous $CO_2$ reacts with water and the neutral form of the amine react to generate carbonic acid ($H_2CO_3$), aqueous bicarbonate ($HCO_3^-$) ions and aqueous carbonate ($CO_3^{2-}$) ions, according to the generally acknowledged equations described below:

 (equation 1)

 (equation 2)

 (equation 3)

 (equation 4)

 (equation 5)

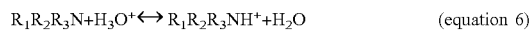 (equation 6)

If the amine contains a primary ($R_1R_2NH$, $R_2$=H) or secondary amine ($R_1R_2NH$, $R_2 \ne H$), an additional reaction pathway becomes available, where carbon dioxide and the primary or secondary amine react to generate carbamic acid ($R_1R_2NCOOH$) and its conjugate base carbamate ($R_1R_2NCOO^-$). Typically the carbamic acid is a stronger acid than its amine precursor and it exists predominantly in its carbamate form. The affinity of a primary or secondary amine to react with $CO_2$ to form carbamate is governed by the electronic environment and the level of steric crowding of the amine functional group. The carbamate may also then participate in acid-base chemistry, according to the generally acknowledged reactions described below. Tertiary amines ($R_1R_2R_3N$, $R_1$, $R_2$, $R_3 \ne H$) cannot form carbamates.

 (equation 7)

 (equation 8)

It is generally acknowledged that the molar absorption capacity of an aqueous amine solution, as measured by the number of moles of $CO_2$ absorbed per mole of amine functionality in solution ($\alpha$), is dependent upon the pH equilibria that operate in the amine solution and the formation of carbamate species.

$CO_2$ desorption is normally achieved by heating of an aqueous amine solution containing $CO_2$. The two major effects of heating are to reduce the physical solubility of $CO_2$ in the solution, and to reduce the $pK_a$ of the amine resulting in a concomitant reduction in pH and in $CO_2$ absorption capacity, the net effect of which is $CO_2$ release. The extent of the reduction in $pK_a$ is governed by the enthalpy of the amine protonation reaction which in turn is governed by the amine chemical structure. All the other reactions, including carbamate formation, have small reaction enthalpies and are as a result relatively insensitive to temperature. Typically, the enthalpy of amine protonation is four to eight times larger than the enthalpies of the carbonate reactions and two to four times larger than the enthalpy of carbamate formation. It is predominantly the lowering of the pH upon heating that drives the reversal of carbamate and carbonate/bicarbonate formation during desorption, rather than any significant reduction in stability.

In summary, there exists a relationship between the change in amine $pK_a$ as a function of temperature and the concomitant lowering of the solution pH, and an aqueous amine solutions ability to absorb and release $CO_2$.

The thermal energy requirement for the release of $CO_2$ is considerable. For $CO_2$ capture from a relatively concentrated $CO_2$ source such as a coal fired power station some 3-4 GJ is required per tonne of $CO_2$ captured. This consumes 20-30% of a power stations energy output. Even more energy is required per unit of $CO_2$ captured from a dilute source such as the atmosphere. This means air capture using such technology is only feasible in close proximity to a large energy source, but is generally energetically unfavourable.

Identification of the problem of the large energy requirement for release of $CO_2$ from a solvent has lead to investigation into ways this can be reduced. One approach is through solvents which have an increased capacity to cyclically absorb and release $CO_2$. However, amines used for industrial $CO_2$ capture that achieve larger $CO_2$ cyclic absorption capacity typically have poor rates of $CO_2$ absorption. Slow $CO_2$ absorption rates are undesirable because to achieve the requisite absorption of $CO_2$ longer gas-liquid contact times are required which means larger absorption columns and greater capital cost. The benefits gained through increased cyclic capacity are thus offset by the disadvantages associated with decreased rates. Furthermore the improvements in terms of reduced energy demand are incremental at best and do not reduce it to the point of making $CO_2$ capture possible without energy penalty.

Many of the issues discussed above in relation to $CO_2$ capture apply to a range of other gaseous pollutants. It is therefore pertinent to identify solvents or solutions with significantly reduced gas release energy requirements for application in gas capture technologies.

SUMMARY

In one aspect there is provided a process for removing a target gas from a gas stream rich in the target gas comprising:

contacting the gas stream with an absorbent solution in which the target gas is soluble to form a target gas rich absorbent solution and a gas stream that is lean in the target gas; and converting a photoactive compound in the gas rich absorbent solution from a first state to a second state wherein the gas rich absorbent solution comprising the photoactive compound in the first state has a higher absorption capacity for the target gas than the gas rich absorbent solution with the photoactive compound in the second state to cause desorption of the target gas from the absorbent solution comprising the target gas.

In one set of embodiments the target gas is an acidic gas and the change in the photoactive compound from the first state to the second state brings about a reduction in pH of the gas rich absorbent solution to provide a pH at which the absorbent solution has a lower absorption capacity for the target gas. The photoactive compound may, for example, act as a Brønsted base or relatively weak Brønsted acid in the first state, and a relatively strong Brønsted acid (with respect to the relatively weak Brønsted acid) in the second state.

In an embodiment the absorbent solution includes the photoactive compound. In an alternative embodiment, the process further includes the step of adding the photoactive compound to the target rich gas solution prior to exposing the target gas rich solution to light.

The photoactive compound may be present in a range of concentrations depending on the extent of change provided by the photoactive compound and the extent of absorption or desorption provided by the transition from first and second states. In one set of embodiments the photoactive compound is present in the solution at a concentration of from about 0.1 mmol/L to about 10 mol/L of absorbent solution.

In one set of embodiments the photoactive compound is a photochromic compound.

Examples of photoactive compounds include at least one selected from the group consisting of spiropyrans, spirooxazines, dithienylethenes, fulgides, fulgimides, perimidinespirocyclohexadienones, quinones, benzodiazepines, naphthopyrans, dihydroindolines, protonated merocyanines and naphthols. More preferably the photoactive compound is at least one selected from the group consisting of spiropyrans, protonated merocyanines and napthols.

In some embodiments the step of converting the photoactive compound from the first state to the second state involves irradiation with light.

The liquid absorbent solution may comprise a compound adapted to improve the absorption of the target gas such as a compound adapted to reversibly bind or react with the target gas. In one set of embodiments the absorbent solution comprises an amine selected from the group consisting of primary, secondary or tertiary amines, alkanolamines, amino acids and mixtures thereof in an amount to provide a pH of the absorbent solution of from about 9 to about 12. Examples of suitable amines include primary amines such as monoethanolamine, ethylenediamine, 2-amino-2-methylethanolamine and benzylamine, secondary amines such as N-methylethanolamine, piperazine, piperidine and substituted piperidine, and diethanolamine, tertiary amines such as N-methyldiethanolamine, and amino acids such as taurine, sarcosine and alanine.

The process step of converting of the photoactive compound from the first state to the second state may involve a transformation of the compound such as selected from the group consisting of: association or dissociation of moieties to or from the photoactive compound, a spatial rearrangement of at least a part of the compound, a steric change to the compound, forming or breaking bonds within the compound, ring formation, a change in the acid dissociation constant or base dissociation constant of at least a part of the compound, or a combination thereof. In one set of embodiments the photoactive compound is a photoacid comprising a nucloeophilic moiety having a photodissociable proton, an electron accepting moiety and a bridge between the nucleophilic and electron accepting moiety wherein the electron accepting moiety bonds to a proton photodissociated from the nucleophilic moiety during reversible photoinduced intramolecular reaction to form a ring.

The process may and typically will involve either irradiating the first state of the photoactive compound with light to affect the change to the second state, irradiating the second state of the photoactive compound following desorption to reform the first state to allow reuse of the absorbent solution in separation of target gas from gas streams or irradiation of both states, generally at different wavelengths of light to produce conversion between the states.

In one set of embodiments the conversion of the photoactive compound from the first state to the second state brings about a reduction in pH of the absorbent solution of at least one unit. In this embodiment the absorbent solution containing the photoactive compound in the first state is contacted with the gas stream to absorb the target gas and the absorbent solution comprising the target gas is irradiated with light to provide the photoactive compound in a higher energy state in which it has a higher $pK_a$.

The photoactive compound may be added to the absorbent solution before during or after contact with the target gas. The timing will of course depend on whether the action of the photoactive compound is required for, or enhances, the absorption of the target gas. In general absorption of the target gas is conducted after the photoactive compound has been added to the absorbent solution. Also it is generally commercially prudent to reuse the absorbent solution after desorption so that it is preferred that absorption of the target gas from the gas stream is carried out in the presence of the photoactive compound.

Examples of target gas for separation by the process may be selected from the group consisting of $CO_2$, $NO_x$ (where x is between 0.5 and 2), $SO_2$, $H_2S$ and halogen gas, such as $Cl_2$, $F_2$, $I_2$, or $Br_2$ gas. The process is particularly suitable for absorption and removal of carbon dioxide.

In one specific set of embodiments there is provided a process for separating carbon dioxide from a gas stream comprising:

providing an absorbent solution comprising an amine selected from the group consisting of selected from primary, secondary or tertiary amines, alkanolamines, and amino acid or mixtures thereof and a photoactive compound having a first state and a second state of lower $pK_a$ than the first state formed on irradiation with light, wherein the amine is present in an amount to provide pH of the absorbent solution in the range of from 9 to 12;

contacting the absorbent solution with a gas stream rich in carbon dioxide to absorb carbon dioxide and provide an absorbent solution rich in absorbed carbon dioxide and a gas stream lean in carbon dioxide;

irradiating the absorbent solution rich in absorbed carbon dioxide with light to convert the photoactive compound from the first state to the second state and produce a reduction in pH of the absorbent solution and reduce the absorption capacity of the absorbent solution to carbon dioxide; and collecting carbon dioxide desorbed from the absorbent solution.

In one set of embodiments the absorbent solution for contacting with a gas stream is an aqueous absorbent solution.

One of the significant advantages of the process is that it may allow the use of sunlight to convert the photoactive compound from the first state to the second state. This allows the energy intensive heating processes to be avoided or reduced.

In yet a further aspect of the invention there is provided an absorbent solution for absorbing a target gas from a gas stream for use in the process as previously defined.

In one set of embodiments the absorbent solution used in the process may be irradiated in a device providing a sample depth for the solution in a range from about 0.1 mm to 10 mm.

The gas stream may consist of the target gas but typically will comprise a mixture of gasses including the target gas.

In another aspect of the invention there is provided a solution, when used to absorb a target gas from a gas stream, the solution including: a solvent, and a photoactive compound dissolved in the solvent, the photoactive compound having a first state and a second state, and being able to undergo a photo-induced change from one of the first state or the second state to the other of the first state or the second state on exposure to light; wherein, when the photoactive compound is in the first state the solution has a higher absorption capacity for the target gas than when the compound is in the second state.

Ideally the target gas is an acidic gas. Preferably the target gas is selected from the group consisting of $CO_2$, $NO_x$ (where x is between 0.5 and 2), $SO_2$, $H_2S$, or a halogen gas, such as $Cl_2$, $F_2$, $I_2$, or $Br_2$. More preferably the target gas is $CO_2$ or $SO_2$. Most preferably the target gas is $CO_2$. In an embodiment a number of target gases may be absorbed from a gas stream using the solution of the present invention, the target gases being selected from various combinations of $CO_2$, $NO_x$, $SO_2$, $H_2S$ or a halogen gas, such as $Cl_2$, $F_2$, $I_2$, or $Br_2$.

In an embodiment the target gas is $CO_2$.

Using a photoactive compound in this way, a solution can be switched between a first mode, wherein the photoactive compound is in the first state; and a second mode, wherein the photoactive compound is in the second state. In the first mode, the solution has a higher absorption capacity (e.g. a strong affinity) for the target gas, resulting in the ready uptake of the target gas by the solution. The target gas can then be solubilised, and may form an intermediary product. The target gas or the intermediary product may then be bound and stored within the solution. In effect, in the first mode the solution has a large capacity to take up and store the target gas. Thus the first mode is a gas absorption mode. In the second mode, the solution has a lower absorption capacity (e.g. a weak affinity) for the target gas or an intermediary product of the target gas. In this case the capacity of the system to retain the target gas or the intermediary product is reduced. This may result in the target gas being liberated from the solution. At the least, when the solution is in the second mode, the energy requirements to remove the target gas from the system have been reduced significantly in comparison to driving the target gas out of solution when the photoactive compound is in the first state. Thus the second mode is a gas desorption mode.

Preferably the solution is a polar solvent such as an aqueous solution. The use of an aqueous solution is advantageous for both economic and environmental reasons. Furthermore, the target gas to be absorbed from the gas stream needs to be at least partially soluble in the solvent, so that the target gas is able to interact with the various constituents of the solution. Many of the gases of interest are at least partially soluble in water.

Application of light to the photoactive compound converts the photoactive compound from at least one of the first or second state, to the other of the first or second state. For example, the photoactive compound is in the first state and on exposure of light, the photoactive compound changes from the first state to the second state. In this case the first state of the photoactive molecule is a ground state, and the second state of the photoactive molecule is an excited state. Alternatively, the photoactive compound is in the second state, and on exposure of light, the photoactive compound changes to the first state. In this case the second state of the photoactive molecule is a ground state, and the first state of the photoactive molecule is an excited state.

It is generally preferred that the first state is the ground state and the second state is the excited state, such that the solution is suitable for absorption of the target gas when the photoactive compound is in the first state (i.e. ground state) and the solution is suitable for desorption of the target gas when the photoactive compound is in the second state (i.e. excited state). This is advantageous as it reduces the overall energy consumption of the process. The target gas can be absorbed into the solution without the input of further energy (such as light), and then energy needs be applied only when it is desired to desorb the gas from the solution. The applied energy is in the form of light energy rather than heat energy that would have otherwise been required if the photoactive molecule was not in the excited state. However, in certain embodiments it may be preferable for absorption of the target gas to occur when the compound is in the excited state, and for desorption to occur when the target gas is in the ground state.

In an embodiment, the photoactive compound is sensitive to particular wavelengths of light. The photo-induced structural change between the required states is achieved by exposure or exclusion of light of specific wavelengths that correspond to the absorption bands of the photoactive molecule. Preferably the photoactive compound is sensitive to both UV light and visible light (i.e. wavelength from 10 nm to 700 nm) and more preferably from a wavelength of about 200 nm to about 500 nm.

Alternatively, the photoactive compound may only be sensitive to visible light having a wavelength of from about 380 nm to about 700 nm. In yet another alternative embodiment the photoactive compound is sensitive to UV light having a wavelength of from about 10 nm to about 400 nm. Having the photoactive compound being sensitive to specific wavelengths of light may be particularly advantageous in the situation where the solution includes multiple different types of photoactive compounds. The different types of photoactive compounds may be converted between their states at different wavelengths such that, if required, it is possible to control the solution such that only one type of photoactive compound undergoes a change in state. This provides fine control over the process. Additionally, each of the different types of photoactive compounds may be selective to a different target gas, and therefore it is operationally advantageous to be able to control the switching of states for each of the different types of photoactive compounds independently of each other and each type of photoactive compound. Alternatively, different photoactive compounds, each absorbing different portions of the solar spectrum could allow for more efficient use of solar energy for gas separation.

In one set of embodiments the light energy applied to the solution is sufficient to cause the photoactive compound to undergo a photo-induced change but is not sufficient to result in heating of the absorbent solution.

A wide range of photoactive molecules may be used. In a preferred embodiment, the photoactive compound(s) is/are selected from the group consisting of: leucohydroxides, perimidinespirocyclohexadienones, azobenzenes, spiropyrans, spirooxazines, dithienylethenes, fulgides, quinones, benzo and napthopyrans, and dihydroindolizines. More preferably the photoactive compounds(s) it is/are selected from the group consisting of: spiropyrans, merocyanines and napthols. Preferably the photoactive compound is a compound that undergoes a change in $pK_a$ on excitation, the change in $pK_a$ being at least about 0.5, more preferably at least about 1.0, even more preferably at least about 2.0, and yet even more preferably at least about 3.0.

In one set of embodiments, photo-excitation of the photoactive molecule leads to a decrease in the pH of the surrounding solution. Preferably, the magnitude of the pH decrease is sufficient to cause desorption of the target gas from the solution, such as for example, the desorption of $CO_2$.

In an embodiment, the photo-induced change is selected from the group consisting of: association or dissociation of moieties to or from the photoactive compound, a spatial rearrangement of at least a part of the compound, a steric change to the compound, forming or breaking bonds within the compound, a change in the acid dissociation constant or base dissociation constant of at least a part of the compound, or a combination thereof. These different physical changes in the excited state can lead to changes in $pK_a$ of the photoactive molecule and thereby influence the pH of the surrounding solution. The methodology to detect and measure the photo-induced change will be readily identified and employed by skilled artisans of the technology.

The photoactive compound may include a specific functional group or moiety that undergoes the photo-induced change. In this case, the photo-induced change is selected from the group consisting of: association or dissociation of an ion to or from the functional group, a spatial rearrangement of the functional group or at least a part of the photoactive compound in the vicinity of the functional group, a change in the steric environment around the functional group, forming or breaking bonds within the functional group, a change in the acid dissociation constant or base dissociation constant of the functional group, or a combination thereof. It is preferred that the functional group is an amine, such as a primary, secondary, or tertiary amine, $CN^-$, $ArO^-$, or a deprotonated diester group.

It is preferred that the photo-induced change modifies the chemical environment of the solution; the change may be electronic in nature or in the level of steric crowding. The photo-induced change may cause a change in the pH or $pK_a$ of the solution. As mentioned above, the change of $pK_a$ on excitation of the photoactive compound is preferably at least about 0.5, more preferably at least about 1.0, even more preferably at least about 2.0, and yet even more preferably at least about 3.0. More preferably, the photo-induced change is a change in the acid dissociation constant or base dissociation constant of the functional group. This is advantageous as many of the target gases that may be absorbed form acids when dissolved in water, for example $CO_2$ forms carbonic acid, as per equation 1. Increasing the pH, or altering the $pK_a$, such that hydronium ions are removed or maintained at low concentration favours the forward reaction which results in more carbon dioxide being absorbed into solution. Decreasing the pH, or altering the $pK_a$, such that hydronium ions are produced or maintained at a high concentration favours the reverse reaction, e.g. that the solution has a low gas absorption capacity, or the promotion of desorption of the target gas from the solution.

Therefore, in the context of what has been discussed above, it is preferred that when the photoactive compound is in the first state, being the ground state, the solution is alkaline or weakly acidic; and on exposure to light, the photoactive compound is converted to the second state, where the solution is acidic. More preferably, the pH of the solution when the photoactive compound is in the first state is from about 9 to about 12; and the pH of the solution when the photoactive compound is in the second state is from about 0 to about 8.

In one set of embodiments the photoactive compound is a photoacid and the pH of the gas rich absorbent solution following absorption of the target gas falls within the operating range $pK_a$ of the photoactive compound wherein excitation of the photoactive compound provides a reduction in pH to produce a lower capacity for the target gas and desorption of the target gas from the absorbent solution.

It is preferred that the photoactive compound is present in the solution at a concentration of from about 0.1 mmol/L to about 10 mol/L. More preferably the photoactive compound is present in a concentration of from about 1 mol/L to about 10 mol/L Most preferably the photoactive compound is present in the solution at a concentration of from about 3 mol/L to about 7 mol/L. That is, the lower value of the concentration range may be from 0.1 mmol/L, preferably from 1 mol/L, more preferably from 3 mol/L; and the upper value of the concentration range may be to 10 mol/L, preferably to 10 mol/L, more preferably to 7 mol/L. The concentration range may be from any of the lower concentration values to any of the upper concentration values. The concentration of the photoactive compound may change depending on the presence of other compounds in the solution. If an additional absorbent molecule is present, such as an amine, then a lower concentration of the photoactive compound may be used.

In one set of embodiments the absorbent solution is an aqueous absorbent solution. In such embodiments it can be desirable for the photoactive compound and any other components of the absorbent solution (e.g. absorbent compounds) to be soluble in water. The target gas also may and preferably will be water soluble.

However the present invention contemplates the use of solvents other than water (e.g. organic solvents) or the use of mixed solvent systems (e.g. a mixture of water and organic solvent) in the absorbent solution. The use of solvents other than water may allow higher concentrations of photoactive compound to be employed or enhanced rates of removal and recovery of a target gas from gas streams to be achieved. For example, more highly soluble photoactive compounds may enable higher concentrations of photoactive compound to be achieved in the absorbent solution, leading to a more marked pH change and enhancements in the process.

In one set of embodiments, the pH change may relate to the concentration of photoactive compound in the solution and in some cases, increasing the concentration of photoactive may allow a greater pH change to be achieved. For instance, the inventors have observed that a photoactive concentration of 0.1 mmol absorbs all of the available useful light within a path length of 10 mm and that increasing the concentration of photoactive by tenfold would see this absorption occur within 1 mm and give a pH change of approximately one more unit.

In some embodiments, the absorbent solution may be irradiated in a device providing a sample depth for the solution in a range of from about 0.1 mm to 10 mm. The sample depth thereby provides a path length for the light in a range of from 0.1 mm to 10 mm.

Once the target gas has been dissolved into the absorbent solution, the target gas needs to be bound in some manner so that it can be retained. There are a number of methods that can be employed to bind the target gas, for example the target gas may bind to the photoactive compound, the solution may include a gas absorbent molecule to which the target gas binds, or a combination of both these methods may be employed. That is, the solution may consist of the photoactive compound in solution, or may include the photoactive compound in combination with other additives, such as further types of photoactive compounds and/or other compounds that are known to act as adsorbents for the target gas. The skilled addressee will appreciate that other methods may also be employed to absorb and retain the target gas within the solution.

In the case where the photoactive compound binds with the target gas or with an intermediary product that is formed when the target gas is absorbed into the solution, the photoactive compound includes a binding functional group that reacts to form a chemical bond with the gas or with the intermediary product. This binding functional group may be the same or different from the functional group that undergoes the photo-induced change. It is preferred that the binding functional group is an amine, such as a primary, secondary, or tertiary amine, $CN^-$, $ArO^-$, or a deprotonated diester group.

Alternatively, or in addition, the solution may include an absorbent compound that binds with the target gas or with an intermediary product that is formed when the target gas is dissolved into the absorbent solution. In this case, the photoactive compound may or may not bind with the target gas. However, the photoactive compound is important for establishing an environment which is favourable for absorption of the target gas into the solution and desorption of the target gas from the solution. When the photoactive compound is in the first state, the solution has a higher absorption capacity for the target gas than when the photoactive compound is in the second state. Thus, when the photoactive compound is in the first state, the target gas can be solubilised and readily bound to the absorbent compound. When the photoactive compound is in the second state, the adsorbent compound has a low capacity to store and bind the target gas, which may cause the target gas to be liberated from the solution, or at least lower the activation energy required to remove the target gas from the solution.

In another aspect of the invention, there is provided the use of a solution as defined above for absorbing a target gas from a gas stream.

Also disclosed herein is a method of determining the absorption capacity of a solution that includes a photoactive compound having a first state and a second state, the photoactive compound being able to undergo a photo-induced change from one of the first state or the second state to the other of the first state or the second state on exposure to light, the method including: determining a first absorption capacity of the solution for a target gas when the photoactive molecule is in one of the first state or the second state, and determining a second absorption capacity of the solution for the target gas when the photoactive molecule is in the other of the first state or the second state. The absorption capacity may be expressed in a number of different ways, but generally relates to the amount of the target gas retained in the solution, e.g. grams of target gas absorbed per liter of solution, or moles of target gas absorbed/moles of absorbent molecules etc.

A ratio of the first absorption capacity to the second absorption capacity provides an indication in the change of absorbance of the solution for a target gas when the photoactive molecule changes between the first and second states.

To provide an accurate comparison of the absorption capacities of the solution the first and second absorption capacities must be measured under identical solution conditions of temperature, total pressure, target gas partial pressure, gas composition, and concentration of absorbent molecules.

In an embodiment, the method may include preparing a first sample of the solution and a second sample of the solution, having the same solution properties, e.g. the first sample and the second sample may be obtained from the same stock solution or batch solution, or alternatively two separate solutions may be prepared having the same concentrations of constituents. The first sample is placed in an environment in which the photoactive molecule is in the first state, and the second sample is placed in an environment in which the photoactive molecule is in the second state, for example the second sample may be exposed to UV or visible light such that the photoactive molecule in the second sample undergoes a photoactive change from the first state to the second state.

Each of the first sample and the second sample are then exposed to a gas stream of the target gas at the same constant temperature and pressure. Wherein the first sample is maintained in an environment such that the photoactive molecule is retained in the first state and the second sample is maintained in an environment such that the photoactive molecule is retained in the second state. Exposure of each of the first and second samples to the gas stream is maintained until each of the first and second samples is saturated with the target gas. The time required to achieve saturation will vary depending upon the amount of solution, the concentration of the photoactive molecule and/or other molecules, and the gas flow rate used. Additionally, the time taken to reach saturation for the first sample may be different from the second sample.

Once each of the first and the second samples are saturated they can be analysed to determine the amount of the target gas that has been absorbed into the solution. This may involve dilution of the samples with a diluent that ensures that the absorbed target gas is retained in solution. There are a number of methods that may be employed to determine the target gas concentration in each of the first and second samples depending on the specific target gas or solution properties. Such methods may include spectroscopy, NMR etc.

Recitation of ranges of values herein are merely intended to serve as a short hand method of referring individually to each separate value and each potential range encompassed within, unless otherwise recited. Furthermore, each separate value and each potential range is incorporated into the specification as if it were individually recited herein.

The term "gas rich" as used herein refers to a solution or composition that is relatively rich in a target gas that has been absorbed from a gas stream. The gas rich solution or composition may have absorbed at least about 10% (v/v), preferably at least about 20% (v/v) (such as at least 40% (v/v) or at least 50% (v/v)), of a target gas from the gas stream.

The term "gas lean" as used herein in reference to a gas stream refers to gas stream in which an amount of a target gas has been removed. Preferably, a gas stream that is lean in a target gas comprises at least 10% (v/v), more preferably at least 20% (v/v) (such as at least 40% (v/v) or at least 50% (v/v)), less target gas than the original gas stream.

The term "light" refers to actinic light and includes all light that can produce photochemical reactions.

The term "photoactive" as used herein in reference to a compound or molecule refers to a compound that is capable of responding to light by chemical reaction such as a structural transformation.

The term "photochromic" as used herein in reference to a compound refers to a compound which undergoes a reversible transformation between two forms by the absorption of electromagnetic radiation, where the two forms have different absorption spectra.

The term "photoacid" as used herein in reference to a compound refers to a compound convertable from a base or relatively weak acid into a relatively strong acid by photolysis.

Percentages referred to herein are percentages by volume (% v/v) unless otherwise specified.

Throughout the description and the claims of this specification the word "comprise" and variations of the word, such as "comprising" and "comprises" is not intended to exclude other additives, components, integers or steps.

In one set of embodiments, the photoactive compound in the absorbent solution is a photochromic compound, preferably a photoacid.

A wide range of photoacid compounds suitable for use in the process for the separation of the target gas are described in the prior art and such compounds are well known in the photochromics art.

Photochromic acids are discussed in Berkovic et al., Chem. Rev. 2000., 100, 1741-1754; Metsuda et al., J. Photochem. Photobiol., C2004, 5169-182; and Yokoyama Chem. Rev. 2000, 100, 1717-1740.

U.S. Pat. No. 4,636,561 (Hosoda) describes a range of spiroindoline naphthoxazines which in some cases are water soluble.

U.S. Pat. No. 6,549,327 (Foucher et al.), U.S. Pat. No. 5,879,592 (Kumar), U.S. Pat. No. 5,185,390 (Fisherat al) and U.S. Pat. No. 6,211,374 (Ippolite) describe a range of spiropyrans which include water soluble compounds.

EP0277639 (Asashi) describes a range of spirooxazines.

Chen et al., Photochem. Photobiol. Sci., 2011, Jun., 10(6) 1023-9 describes water soluble fulgides and fulgimides.

Johns et al., Chemistry, 2014, Jan. 13: 20(3):689-92 describes trifluoromethylphenyl-tricyano-furan photoacids.

A particularly preferred range of photoacids due to the extent of pH change provided, are disclosed in US 2013/0192978 (Liao) and Shi et al. J. Am. Chem. Soc. 2011, 133 (37) 14699-14703. Liao and Shi et al describe protonated merocyanine and other photoacid compounds comprising a nucleophilic moiety having a dissociable proton, an electron accepting moiety, and a bridging group bonded to both the nucleophilic moiety and electron accepting moiety during a reversible photo-induced intramolecular reaction to form a ring. Shi et al. J. Am. Chem. Soc. 2011, 133 (37) 14699-14703 describe merocyanine photoacids which change from a relatively weak acid form such as a protonated merocyanine to produce a spiropyran relatively strong acid and provide a pH change of as much as 2.2 pH units. Bao et al. *RSC Adv.*, 2014, 4, 27277-27280 and Luo et al. *J. Mater. Chem. B*, 2013, 1, 887-1001 demonstrate the use of the merocyanine-spiropyran system in aqueous biological systems with light irradiation of the ring opened protonated merocyanine producing a spiropyran, accompanied by a significant drop in pH.

Nunes et Al., J. Am. Chem. Soc., 2009, 14331 (26) 9356-9462; Lauren et al., Acc. Chem. Res., 2002, 35, 19-27 describe a range of photoacids based on hydroxyarenes and in particular 1-naphthols and 2-naphthols including 1-(substituted aliphatic)-2-naphthols.

U.S. Pat. No. 7,588,878 (Iftime et al.) describe photoacid generators include halogenated triazines, onium salts such as aryldiazonium salts and diaryl halonium salts, triaryl sulfonic salts, sulfonated esters, substituted hydroxyimides, substituted hydroxylimines, azides, naphthoquinones such as diazonaphthoquinones, diazo compounds, and combinations thereof. Another class of photoacid generator materials is represented by non-ionic photoacid generators, such as nitrobenzyl esters, sulfones, phosphates, and the like. Specific examples are provided using dialkylphenacyl sulfonium tetrafluoroborate as the photoacid. The photoacid compounds generally generate an acid by being irradiated with an active energy beam such as UV light. A further review of photoacid and photobase generators can be found, for example, in Prog. Polym. Sci. vol. 21, 1-45, 1996.

WO2011/020928 (Walzel et al) describes a number of protonated sunscreen agents which may be used as photoacids.

As shown above a very wide range of photoactive compounds are known which may be used in the absorbent solution so as to facilitate absorption of the target gas and desorption as a result of a change in pH. Some general classes of photochromic photoactive compounds may be described with reference to the non-limiting examples illustrated below, which show the transformation actuated by irradiation with light.

Fulgides

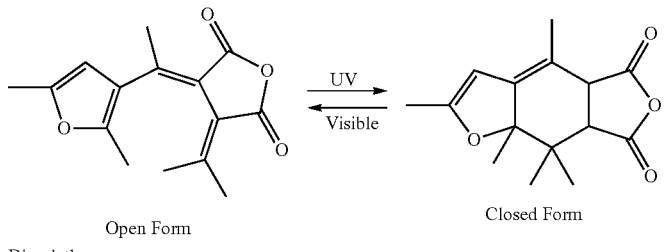

Open Form  Closed Form

Diarylethenes

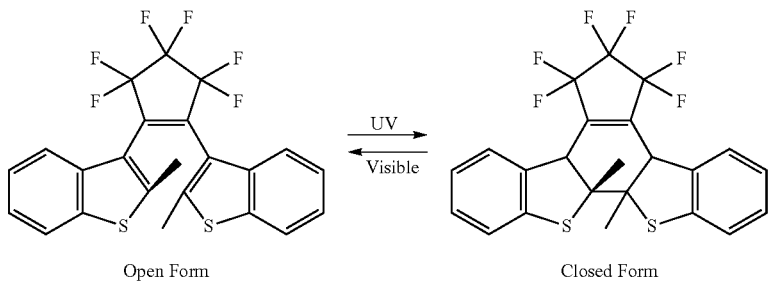

Open Form  Closed Form

Azobenzenes

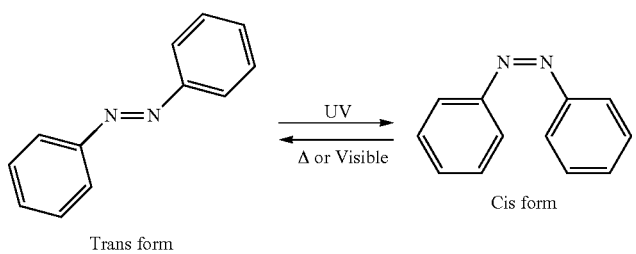

Trans form  Cis form

Spiropyrans

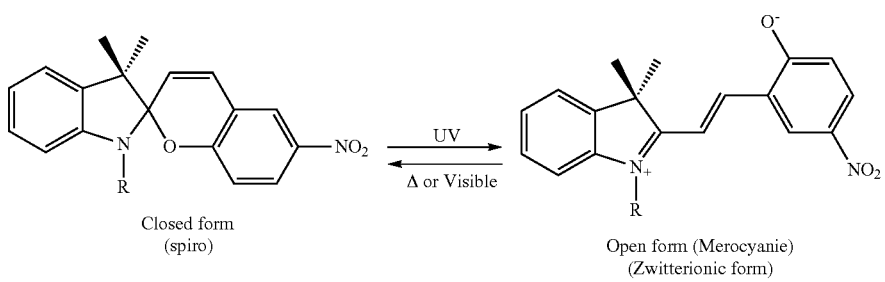

Closed form (spiro)  Open form (Merocyanie) (Zwitterionic form)

Spirooxazines

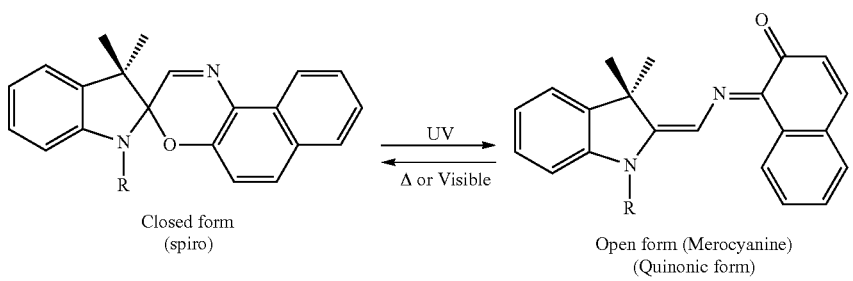

Closed form (spiro)  Open form (Merocyanine) (Quinonic form)

Quinones

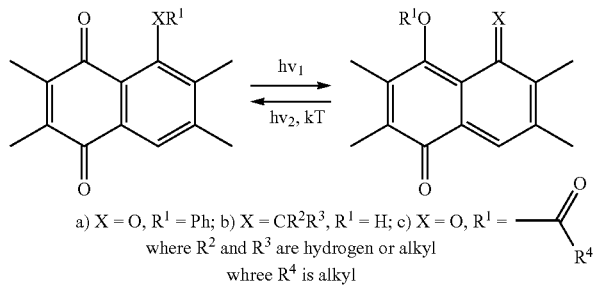

a) X = O, R¹ = Ph; b) X = CR²R³, R¹ = H; c) X = O, R¹ = —C(=O)R⁴
where R² and R³ are hydrogen or alkyl
whree R⁴ is alkyl Triphenylmethanes

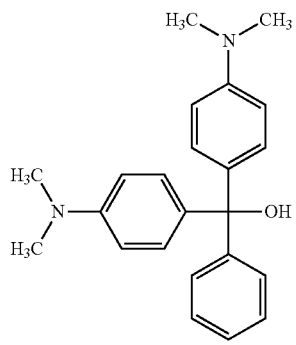

In the above examples of spiropyrans and spirooxazines the substituent "R" may, for example, be selected from the group consisting of hydrogen, $C_1$ to $C_6$ alkyl and —$(CH_2)_n$W where n is from 1 to 6 (preferably 2 to 4) and W is —$NH_2$, $CO_2^-$ or $SO_3^-$ (preferably $SO_3^-$).

In one set of embodiments the photoactive compound is a photoacid. Photoacid compounds useful for the present invention exist in acid form (i.e. protonated form) in the ground state and are transformable to an excited state upon irradiation with light. The excited state is typically a conjugate base of the photoacid and may exist in deprotonated form. The donation of a proton by the ground state form upon irradiation and transformation to the excited state form lowers the pH of the surrounding solution.

Preferred photoacid compounds may belong to a class selected from the group consisting of naphthols (such as 1-(2-nitroethyl)-2-naphthol) and the protonated merocyanine ring opened form of spiropyrans.

It is desirable that the pH of the gas rich absorbent solution prior to irradiation be within the operating range of the photoactive compound. Components of the gas rich absorbent solution that may contribute to pH include the absorbed target gas (e.g. carbon dioxide), the absorbent compound (e.g. amines), as well as any other components that may be present in the solution. If necessary, the pH of the gas rich absorbent solution may be adjusted.

The operating range of the photoactive compound may be related to the difference in $pK_a$ between the excited and ground states of the photoactive molecule. The operating range may be ascertained by determining the $pK_a$ of the photoactive compound in its ground state (e.g. the base or relatively weak acid form) and the $pK_a$ of the compound in its excited state (e.g. the relatively strong acidic form). The difference in $pK_a$ between these two forms therefore defines the operating range of the photoactive compound.

In one embodiment the excited state form of the photoactive compound has a lower $pK_a$ than the ground state form of the compound.

In alternative embodiment, the excited state form the photoactive compound has a higher $pK_a$ than the ground state form of the compound.

In one embodiment, the pH of the gas rich absorbent solution is such that the photoactive compound in the gas rich solution is in basic or weakly acidic form.

Irradiation of the photoactive compound may lead to formation of a relatively strong acid and hence decrease the pH of the gas rich absorbent solution.

Thus in some embodiments the pH of the absorbent solution falls within the operating range $pK_a$ of the photoactive compound and excitation of the photoactive compound provides a reduction in pH.

In one set of embodiments, an amine is used as an absorbent compound for the target gas. The amine may be selected on the basis of its $pK_a$ and the pH of the absorbent solution comprising the photoactive compound when in the excited state. For example, upon excitation a photoactive compound may decrease the pH of the absorbent solution. The absorbent solution including amine and absorbed target gas may be used as a basis for selecting the photoactive compound such that the pH of the solution containing the target gas is within the $pK_a$ range of the photoactive.

In one embodiment a photoactive molecule may provide a decrease in pH upon excitation up to a certain pH value. In such embodiments the absorbing amine for use with this photoactive molecule may be chosen to have a $pK_a$ that is lower than that pH value. This means that the absorption of a target gas such as $CO_2$ by the absorbent solution will reduce the pH of the solution at large to below the pKa of the photoactive compound, thereby allowing the excitation by light to cause a pH decrease.

Further aspects of the present invention and further embodiments of the aspects described in the preceding paragraphs will become apparent from the following description, given by way of example and with reference to the accompanying drawings.

DETAILED DESCRIPTION

The invention relates to the use of a photoactive compound in a solution for absorbing a target gas from a gas stream.

Figure 1:
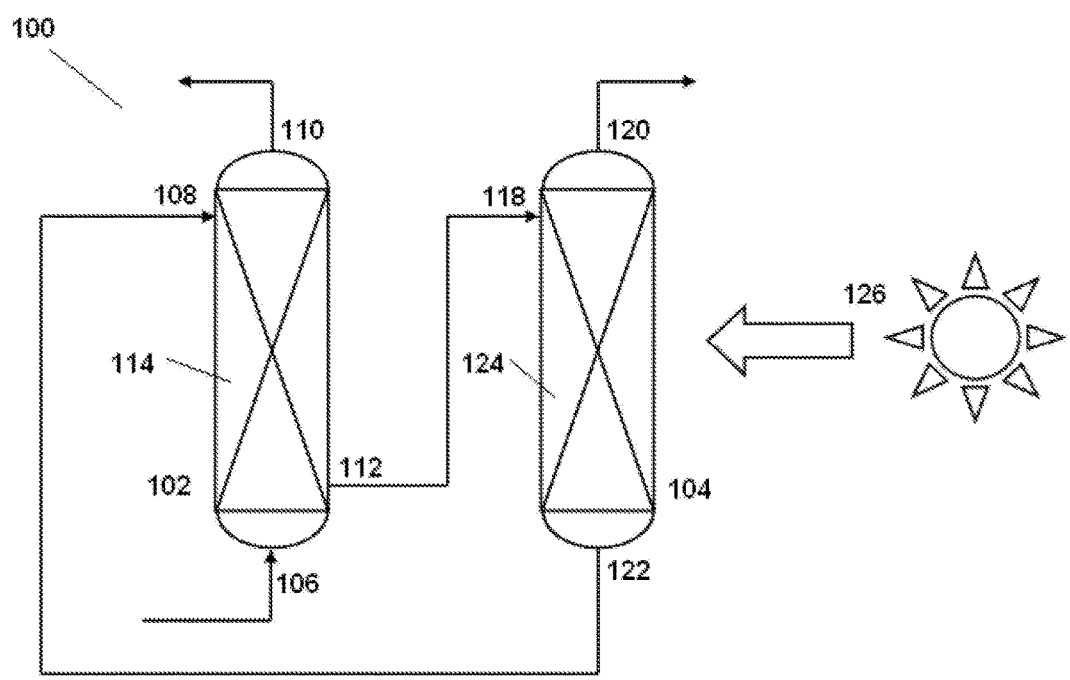
FIG. 1 illustrates a process for removing a target gas from a gas stream according to the present invention.

FIG. 1 provides an illustration of an embodiment of a process for capture of a target gas from a flue gas stream. In this particular embodiment, the target gas is $CO_2$. The process 100 includes an absorption reactor 102, for absorbing $CO_2$ from a flue gas stream, and a desorption reactor 104 for desorbing $CO_2$.

The absorption reactor 102 includes a first inlet 106, a second inlet 108, a first outlet 110, and a second outlet 112, and a gas absorption contact region 114. The first inlet 106 of the absorption reactor 102 is a flue gas inlet through which a $CO_2$ rich flue gas enters the absorption column 102. The second inlet 108 is an absorbent solution inlet through which a $CO_2$ lean absorbent enters the absorption column 102. The $CO_2$ rich flue gas and the $CO_2$ lean absorbent contact in the gas absorption contact region 114. In this region the $CO_2$ in the $CO_2$ rich flue gas is absorbed into the absorbent solution where it is bound in solution.

The absorbent solution includes a photoactive molecule, such as a photoactive acid or base. The photoactive acid or base undergoes photoisomerism, or other light induced structural changes, leading to a change in the $pK_a$ and a change in the pH of the solution. In this embodiment, the photoactive molecule exhibits a photo-induced change in Brønsted acid-base properties on exposure to light. In the first state, the ground state, the photoactive molecule acts as a Brønsted base or weak Brønsted acid, to provide an absorbent solution with a pH in the range 9-12, thus absorption of $CO_2$ is carried out with the molecule in its basic or weakly acidic form. When in this state, the absorbent solution is able to absorb and retain $CO_2$ from the $CO_2$ rich flue gas with higher affinity and capacity than when the molecule is in a second state. In the second state, or excited state, which occurs when the photoactive molecule is exposed to light, the photoactive molecule is converted to a strong Brønsted acid resulting in a solution with a pH in the range 0-8.

In this particular embodiment, the photo-induced change of the photoactive molecule, where the photoactive molecule is a photo-acid, is illustrated below:

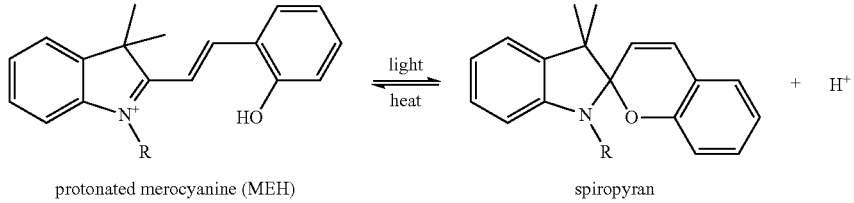

protonated merocyanine (MEH)      spiropyran where R is selected from the group consisting of hydrogen, $C_1$ to $C_6$ alkyl and $—(CH_2)_nW$ where n is from 1 to 6 (preferably 3 or 4) and W is $—NH_2$, $CO_2^-$ or $SO_3^-$ (preferably $SO_3^-$).

As can be seen, when the photoactive molecule is in the ground state, it is a weak acid or weak base (left hand molecule). The photoactive molecule in the ground state may be in protonated form. However, when converted to the excited state (right hand molecule), the photoactive molecule is a strong acid and acts as a proton source leading to a decrease in pH.

In this embodiment, when R comprises $NH_2$ the photo-induced change alters the affinity of the photoactive molecule for direct reaction with $CO_2$ of the primary amine to form a carbamate. The ground state has a strong affinity for $CO_2$, and the excited state has a lower affinity for reacting with $CO_2$.

In some embodiments the photoactive molecule may be a naphthol, for example the 1-(2-nitroethyl)-2-naphthol shown below:

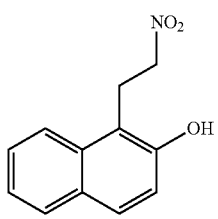 [SMILES: O=[N+]([O-])CCc1c(O)ccc2ccccc12]

The ground state of the naphthol has a $pK_a$ of 9.7 and the excited state has a $pK_a$ of 1.9.

The absorption of $CO_2$ from the $CO_2$ rich flue gas into the absorbent solution results in a $CO_2$ lean gas and a $CO_2$ rich absorbent solution. The $CO_2$ lean gas may still include some $CO_2$, but at a lower concentration than the $CO_2$ rich flue gas, for example a residual concentration of $CO_2$.

The $CO_2$ lean gas leaves the absorption column 102 through the first outlet 110, which is a $CO_2$ lean gas outlet. The $CO_2$ rich absorbent solution leaves the absorption column through the second outlet 112, which is a $CO_2$ rich absorbent outlet.

The desorption reactor 104 includes an inlet 118, a first outlet 120, a second outlet 122, and a gas desorption region 124. The $CO_2$ rich absorbent outlet 112 of the absorption column 102 forms the inlet 118 of the desorption column 104. Desorption of $CO_2$ from the $CO_2$ rich solution occurs in the gas desorption region 124. In the gas desorption region 124, the $CO_2$ rich solution is exposed to light, which in this case is sunlight 126.

On exposure to sunlight 126, the photoactive molecule in the $CO_2$ rich solution undergoes a photo-induced change to the excited state which converts the photoactive molecule to a strong Brønsted acid, lowering the pH of the $CO_2$ rich solution to within the range of pH 0-8. Broadly, in regard to photo-induced changes in Brønsted acid-base properties, in some cases, e.g. spiropyrans, leucohydroxide, the change in pH is a result of new ions being introduced to the solution. In other cases e.g. dithientlethenes, fulgides, the change in pH is due to a functional group in the molecule changing its $pK_a$ in response to photo-induced structural reorganisation. However, in the present embodiment, the photo-induced change is as a result of the photoactive molecule acting as a proton source, as illustrated above.

In the excited state, the photoactive molecule itself has a low affinity for bonding with $CO_2$, and the lower pH of the solution favours desorption of $CO_2$ from the $CO_2$ rich absorbent solution. The excited state of the molecule, and the lower pH of the solution, reduces the overall energy required to liberate $CO_2$ from being bound in solution. Thus, exposure of the $CO_2$ rich solution to light may cause desorption of $CO_2$ to occur, or at least reduces the amount of heat energy required to drive $CO_2$ out of the $CO_2$ rich solution in comparison with the amount of heat that otherwise would have been required to remove $CO_2$ from being bound by the photoactive molecule when the photoactive molecule is in the ground state. In brief, $CO_2$ release is effected by conversion of the photoactive molecule to its acidic from through modulation of light exposure (e.g. controlling the amount and/or wavelength of exposed light). This is because the photo-induced change mimics the relationship between amine $pK_a$ and temperature to achieve the same effect rather than, or in addition to, heat induced changes. In this particular embodiment, further heat energy is required to effect desorption of $CO_2$ from the $CO_2$ rich solution.

Removal of $CO_2$ from the $CO_2$ rich solution results in the formation of a $CO_2$ gas stream and a $CO_2$ lean absorbent solution. The $CO_2$ lean absorbent solution may still include some $CO_2$, but at a lower concentration than the $CO_2$ rich solution, for example a residual concentration of $CO_2$.

The $CO_2$ gas stream is taken off via the first outlet 120, which is a $CO_2$ outlet. The $CO_2$ lean absorbent solution is taken off via the second outlet 122, which is a $CO_2$ lean absorbent solution outlet. The $CO_2$ lean absorbent is then recycled and fed through the second inlet 108 to the absorption column 102.

The above process is described with respect to a photoactive molecule that both binds with $CO_2$, and changes the environment of the absorbent solution to enhance the uptake of $CO_2$ by the solution, and to improve the ability of the photoactive molecule to bind with the $CO_2$.

In an alternative embodiment, the absorbent solution includes a $CO_2$ absorbent molecule in addition to the photoactive molecule. In this case, the role of the photoactive molecule is largely to affect the environment of the absorbent solution. When the photoactive molecule is in the ground state, the environment of the absorbent solution is such that absorption of $CO_2$ into the solution is enhanced. The $CO_2$ then binds with the $CO_2$ absorbent molecule. The photoactive molecule may or may not bind with $CO_2$. When the photoactive molecule is in the excited state, the environment of the absorbent solution is such that the affinity or propensity of the solution for absorption and retention of $CO_2$ is reduced. The $CO_2$ absorbing molecule releases $CO_2$ into solution, and $CO_2$ is liberated from solution. As discussed above, some external heat energy may be required to drive the release and liberation of $CO_2$ from the absorbent solution.

An absorbent solution for absorbing an acid gas may comprise an amine such as a primary, secondary or tertiary amine, an alkanolamine, an amino acid or mixtures thereof. Suitable amines are known in the art and a skilled person will have no difficulty in selecting suitable amines having regard to the function known of the amine and the combination with the photoactive compounds described herein. Examples of alkanolamines are described in US2011/0116997 and US2013/0291724. Examples of alkyl amines and alkanolamines are also described in US2013/0291724. Suitable amines may be selected from the group consisting of alkyl amines, alkanolamines and amino acids, including but not limited to monoethanolamine, ethylenediamine, N-methylethanolamine, 2-amino-2-methyl-ethanolamine, N-methyldiethanolamine, piperazine, piperidine and substituted piperidine, benzylamine, diethanolamine, taurine, sarcosine and alanine. The amine compound may interact with a target gas such as $CO_2$ and enhance the absorption of the target gas from a gas stream.

In yet another alternative embodiment, a variation on the scheme above could use an absorbent solution including a non-photoactive amine to absorb the $CO_2$, and then after a $CO_2$ rich solution has formed, adding a photoactive molecule into the solution before exposing the solution to light. On exposure to light, the photoactive molecules are changed to the excited state, which promotes $CO_2$ desorption. The photoactive molecules may be added to solution and removed once $CO_2$ desorption is complete, or the photoactive molecules could be anchored onto solid materials exposed to the light. In this way the photoactive molecules are not involved in the absorption reaction, and are only mixed with the $CO_2$ rich solution when removal of $CO_2$ is desired.

In another set of embodiments, the photoactive compound may combine the properties of a photoacid and an amine in a single molecule. An example of such a photoactive compound is protonated merocyanine (MEH) and its spiropyran form illustrated above, when R comprises $NH_2$. A photoactive compound having combined properties may provide enhanced $CO_2$ absorption through interaction of the target gas with the amine group whilst also be capable of undergoing a photo-induced change upon irradiation.

Figure 2:
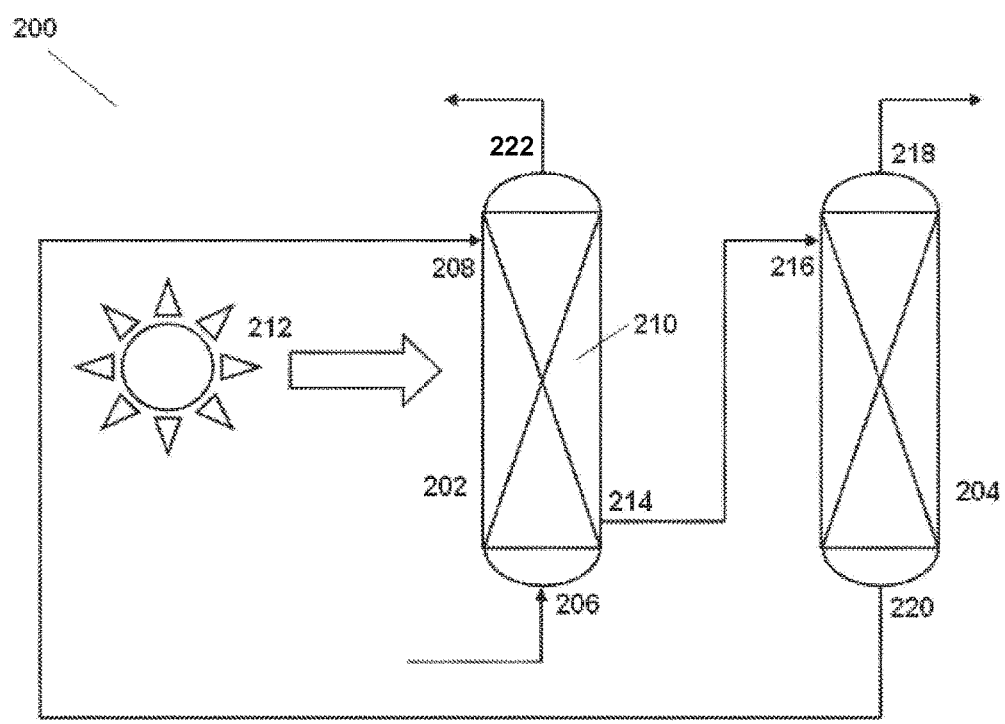
FIG. 2 illustrates an alternative process for removing a target gas from a gas stream according to the present invention.

FIG. 2 provides an illustration of another embodiment a process for capture of a target gas from a flue gas stream. In this particular embodiment, the target gas is $CO_2$. This process 200 involves a similar layout to that in FIG. 1, where the process 200 includes an absorption reactor 202, for absorbing $CO_2$ from a flue gas stream, and a desorption reactor 204 for desorbing $CO_2$. However, in this process the photoactive molecule has a ground state in which the photoactive molecule acts as a strong Brønsted acid form with a solution pH in the range 0-8. When in the ground state, the absorbent solution has a low affinity, or low capacity to absorb and retain $CO_2$. In the excited state, which occurs when the photoactive molecule is exposed to light, the photoactive molecule acts as a Brønsted base or weak Brønsted acid, to provide an absorbent solution with a pH in the range 9-12. When in the excited state, the absorbent solution is able to absorb and retain $CO_2$ from a $CO_2$ rich flue gas with higher affinity and capacity than when the molecule is in the ground state.

In this process 200, a $CO_2$ rich flue gas is introduced into the absorption reactor 202 via a flue gas inlet 206. A $CO_2$ lean absorbent solution is introduced into the absorption reaction 202 via an absorbent solution inlet 208. The $CO_2$ rich flue gas and the $CO_2$ lean absorbent solution contact in a contact region 210 of the absorption reactor 202. The contact region 210 is exposed to light, such as UV light 212. The presence of the light 212 ensures that the photoactive molecule in the $CO_2$ lean absorbent solution is in its excited state.

As discussed above, in this embodiment, when the photoactive molecule is in the excited state, it acts as a Brønsted base or weak Brønsted acid, to provide an absorbent solution with a pH in the range 9-12. This environment is favourable for the absorption and retention of $CO_2$. $CO_2$ is absorbed from the $CO_2$ rich flue gas into the $CO_2$ lean absorbent solution to form a $CO_2$ lean flue gas and a $CO_2$ rich solution.

In any event, the $CO_2$ lean flue gas exits the absorption reactor 202 via the flue gas outlet 222 and the $CO_2$ rich solution exits the absorption reactor 202 through a $CO_2$ rich absorbent outlet 214.

The $CO_2$ rich absorbent outlet 214 forms the inlet 216 to the desorption reactor 204. The internal environment of the desorption reactor is such that the photoactive molecule is changed from the excited state to the ground state, where the photoactive molecule acts as a strong Brønsted acid. As discussed previously, when the photoactive molecule acts as a strong Brønsted acid, the solution environment is less energetically favourable to the absorption and retention of $CO_2$. As above, $CO_2$ may desorb from the solution, or some additional heat may be required to desorb $CO_2$ from solution. Desorption of $CO_2$ results in a $CO_2$ gas stream and a $CO_2$ lean absorbent solution. The $CO_2$ gas stream is removed from the desorption column 204 via outlet 218, and the $CO_2$ lean absorbent solution is removed from the desorption column 204 via outlet 220 and can be recycled to the absorption column 202 via inlet 208.

In an alternative embodiment, the absorbent solution includes a $CO_2$ absorbent molecule in addition to the photoactive molecule. In this case, the role of the photoactive molecule is largely to affect the environment of the absorbent solution. When the photoactive molecule is in the excited state, the environment of the absorbent solution is such that absorption of $CO_2$ into the solution is enhanced. The $CO_2$ then binds with the $CO_2$ absorbent molecule. The photoactive molecule may or may not bind with $CO_2$. When the photoactive molecule is in the ground state, the environment of the absorbent solution is such that the affinity or propensity of the solution for absorption and retention of $CO_2$ is reduced. The $CO_2$ absorbing molecule releases $CO_2$ into solution, and $CO_2$ is liberated from solution. As discussed above, some external heat energy may be required to drive the release and liberation of $CO_2$ from the absorbent solution.

In yet another alternative embodiment, a variation on the scheme above could use an absorbent solution including a non-photoactive amine to absorb the $CO_2$, and a photoactive molecule into the solution and then exposing the solution to light to effect $CO_2$ absorption. The photoactive molecules may be added to solution and removed once the $CO_2$ absorption is complete, or the photoactive molecules could be anchored onto solid materials exposed to the light. In any event, after a $CO_2$ rich solution has formed, the photoactive molecules are removed from the solution which promotes $CO_2$ desorption. In this way the photoactive molecules are not involved in the desorption reaction, and are only mixed with the $CO_2$ lean solution when absorption of $CO_2$ is desired.

A person skilled in the relevant art would appreciate that the absorption of $CO_2$ and its removal from a $CO_2$ rich flue gas could be influenced by a number of factors. These factors may include for example, the engineering of the process, the design of the reactors, the intensity of light used to irradiate the photoactive compound, the dimensions of the absorption and desorption reactors including the thickness of the gas contact region or the gas desorption region, the residence time of the absorbent solution in the gas absorption or gas desorption contact region, the efficiency of contact between the absorbent solution and the gas, as well as the type of photoactive compound and absorbent compound (if any) used. Each of these factors may influence the amount of target gas absorbed or desorbed. In one set of embodiments, the process of the invention removes at least 10% (v/v), preferably at least 20% (v/v) (for example at least 40% (v/v) or at least 50% (v/v)), of a target gas from a gas stream rich in the target gas.

The invention will now be described with reference to the following examples. It is to be understood that the examples are provided by way of illustration of the invention and that they are in no way limiting to the scope of the invention.

EXAMPLES

Example 1

This example describes a method of measurement of affinity for reaction with a target gas.

As discussed previously, the target gas is preferably an acid gas of which $CO_2$ is an example. The below discussion provides an embodiment of a methodology to measure the affinity or capacity of the absorbent solution for a target gas when the photoactive molecule is in the first state or the second state. In this embodiment, the target gas is $CO_2$. However, it will be understood that this method may be generally applicable to determine the affinity or capacity of the absorbent solution for any acidic target gas, and is not limited to $CO_2$.

The affinity for reaction with $CO_2$ is defined as the amount of $CO_2$ absorbed by a solution in moles of $CO_2$ absorbed/moles of absorbent molecules. The relative affinity of different solutions is compared under identical conditions of temperature, total pressure, $CO_2$ partial pressure, gas composition, and concentration of absorbent molecules.

A known mass of solution containing the photoactive molecule/s at the desired concentration/s is placed in a reaction vessel that is fully or partially transparent to UV-visible light (e.g. a vessel made of quartz or containing a quartz window). The photoactive molecule/s is/are then placed in the desired state for $CO_2$ absorption (i.e. state which has greater or lower affinity for $CO_2$). Depending upon the properties of the photoactive molecule/s this may be by exposure to UV-visible light of wavelengths matching the absorption bands of the molecule/s, or by exclusion of UV-visible light.

At constant temperature and while maintaining exposure to/exclusion of UV-visible light a gas stream containing $CO_2$ at a pressure of 101.3 kPa is slowly bubbled through the solution. This condition is maintained until the solution is saturated with $CO_2$. The time required to achieve saturation will vary depending upon the amount of solution, the concentration of photoactive and other molecules and the gas flow rate used, but is typically a number of hours.

Once saturated a liquid sample is taken from the reactor and added to a solution of 1 mol/L sodium hydroxide of at least 10 times the volume of the sample to ensure the absorbed $CO_2$ remains in solution. This mixture of liquid sample and sodium hydroxide solution is then analysed for the $CO_2$ content via a published and validated method to determine the $CO_2$ content of an aqueous amine solution such as: measurement of the carbon-13 NMR spectrum and quantification of the concentration of all $CO_2$ containing species; or heating under acidified conditions and measuring the amount of $CO_2$ evolved using a $CO_2$ analyser, or by absorption into an indicator solution.

The affinity for reaction with $CO_2$ is expressed in the moles of $CO_2$ absorbed/moles of absorbent molecules as determined by this analysis.

Example 2

This example demonstrates a process for removal of a target gas exemplified by $CO_2$ using a photochromic compound exemplified by the merocyanine-spiropyran photochromic system shown in the following scheme.

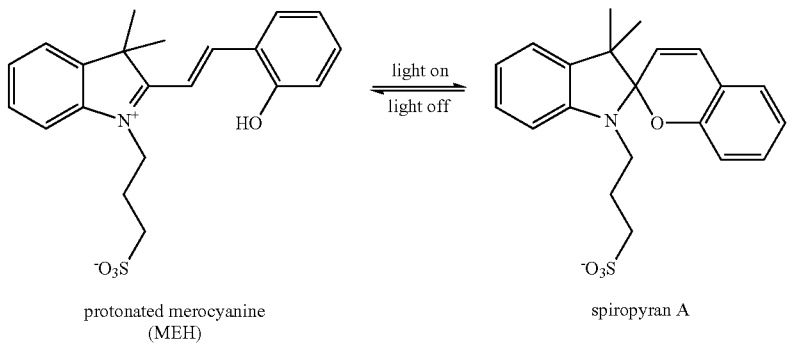

protonated merocyanine (MEH)

spiropyran A

The process of light driven stripping of $CO_2$ from aqueous solution by action of photochromic molecule is demonstrated in the following way. An aqueous solution is prepared first with a concentration of protonated merocyanine (MEH) ($1E^{-4}$ molar), to which was added an amine selected to operate in the pH range determined by MEH. The solution is then saturated with $CO_2$ and the pH recorded to be 5. Photoexcitation is carried out to achieve the pH change using a 500 W HgXe arc lamp representing sun like illumination. The solution was passed through a photoreactor cell at a rate of flow past the irradiating light approximating the required time for exposure of a similar solution of MEH to produce the maximum pH change. The irradiation induces transformation of the photoactive compound, with the transformation producing a reduction in pH leading to desorption of $CO_2$. The solution that exited the photoreactor cell was collected and the pH measurement of this solution was found to be 6.5. In the solution exiting the cell, $CO_2$ has been desorbed from the solution and the photochromic compound has returned to its ground state form (MEH). The final pH of 6.5 represents the pH of the exiting solution after $CO_2$ desorption. The results are shown below:

| Amine name and conc. | Photoactive name and conc. | Initial pH | $CO_2$ absorbed | Light wavelength/ intensity | Final pH | $CO_2$ desorbed |
|---|---|---|---|---|---|---|
| Ethylenediamine 0.1 mM | MEH 0.1 mM | 5 | 7 mM | Hg/Xe lamp 500 W | 6.5 | 6.5 mM |

Figure 3:
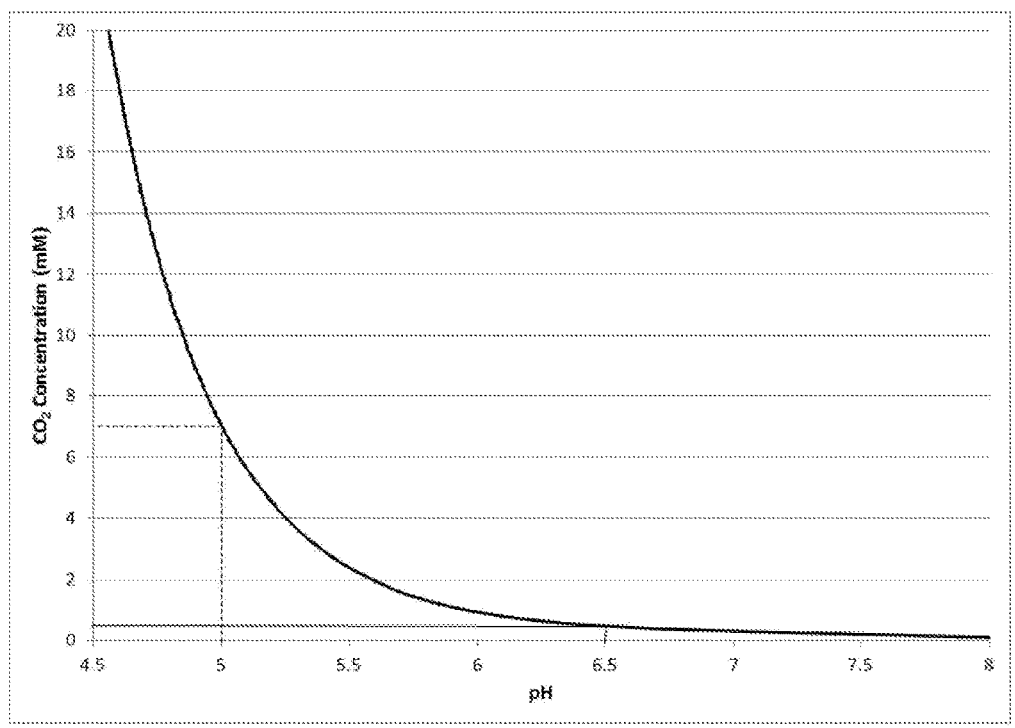
FIG. 3 is a graph illustrating the relationship between absorbent solution pH and $CO_2$ concentration.

A quantitative relationship exists between the absorbent pH and its $CO_2$ content. By taking into account the relevant reactions between $CO_2$ and amine and the $pK_a$ of the photochromic molecule in the ground state, the $CO_2$ content of the absorbent can be calculated using the published method Puxty, G., Maeder, M. *Int. J. Greenh. Gas Control*, 17 (2013), 215-224. A plot showing this relationship for 0.1 mM ethylenediamine and 0.1 mM MEH is shown in FIG. 3. The $CO_2$ content at pH 5 and 6.5 is shown in FIG. 3, with the difference being the amount of $CO_2$ removed.

Example 3

This example demonstrates a process for removal of a target gas exemplified by $SO_2$ using a photochromic compound exemplified by the merocyanine-spiropyran photochromic system shown below.

method Puxty, G., Maeder, M. *Int. J. Greenh. Gas Control*, 17 (2013), 215-224. The difference in pH of the absorbent at each concentration of absorbed $CO_2$ is indicative of the ability of excitation to remove $CO_2$ from the absorbent. The calculation was completed at 25° C. using the amines monoethanolamine ($pK_a$=9.4) and piperidine ($pK_a$=11.1) with the relevant reaction equilibrium constants taken from Fernandes, D., et al., *J. Chem. Thermodynamics*, 51 (2012), 97-102 and Fernandes, D., et al., *J. Chem. Thermodynamics*, 54 (2012), 183-191.

Figure 5:
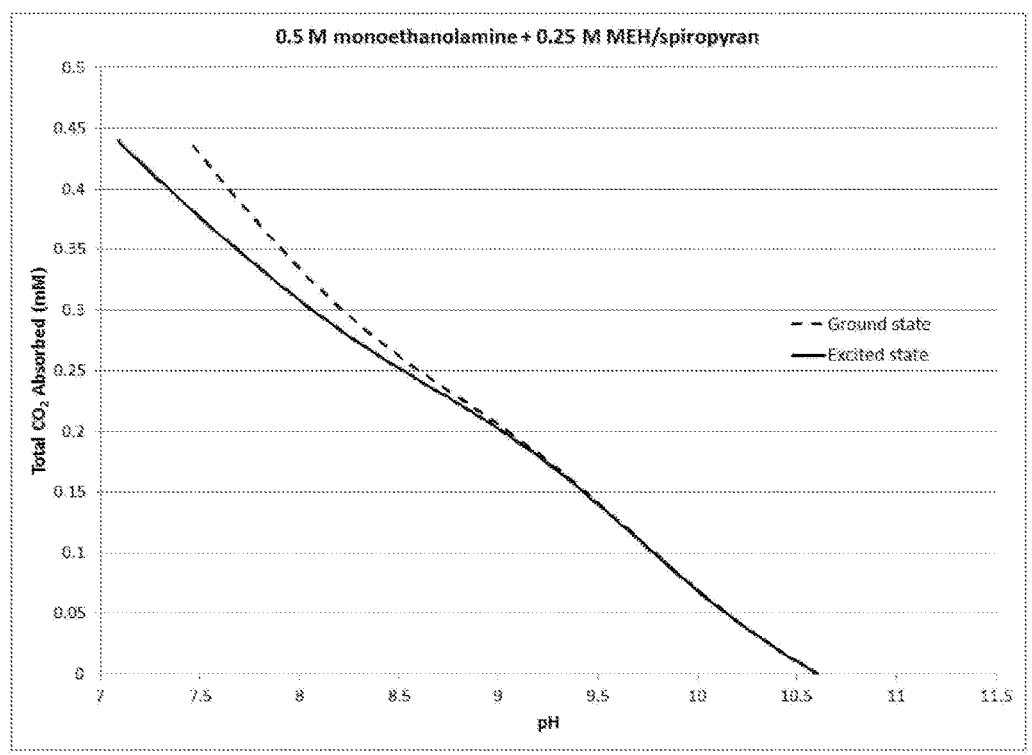
FIG. 5 is a graph illustrating the relationship between $CO_2$ absorption and pH by an absorbent solution containing monoethanolamine and MEH/spiropyran photoactive compound in the ground state and the excited state in accordance with an embodiment of the present invention.
Figure 6:
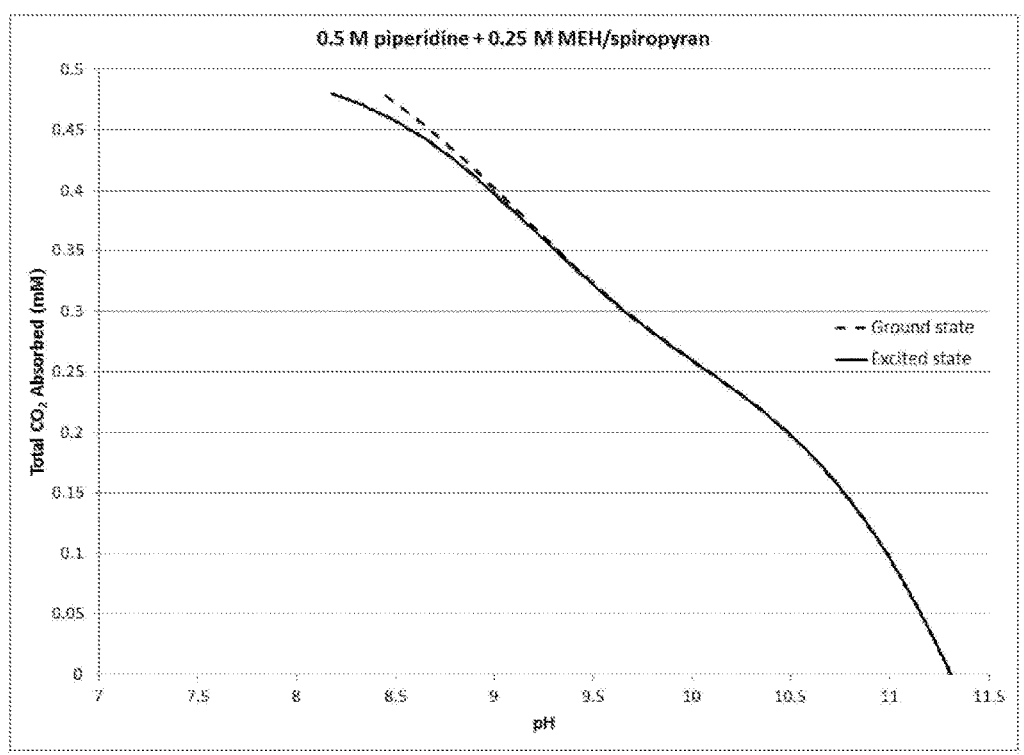
FIG. 6 is a graph illustrating the relationship between $CO_2$ absorption and pH by an absorbent solution containing piperidine and MEH/spiropyran photoactive compound in the ground state and the excited state in accordance with an embodiment of the present invention.

The results of calculated $CO_2$ absorption for absorbent solutions containing 0.25M MEH/spiropyran and either monoethanolamine and piperidine is shown in FIGS. 5 and 6, respectively.

As seen in FIG. 5, a larger difference in pH is evident for the monoethanolamine sample indicating that when using

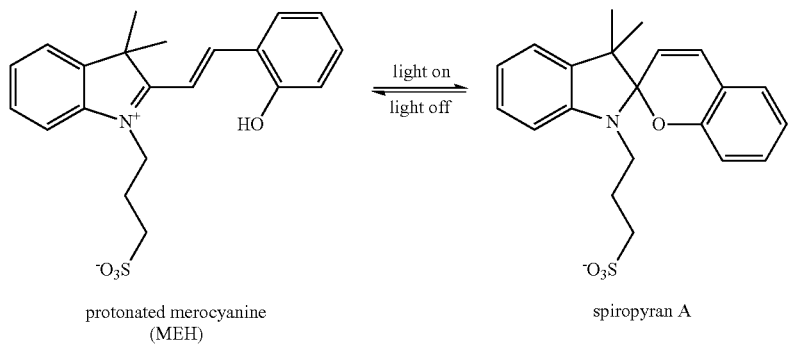

protonated merocyanine (MEH)

spiropyran A

In this example, the process conditions of Example 2 is repeated, however the target gas is $SO_2$ instead of $CO_2$. The absorbent solution is an aqueous composition with 0.1 mM ethylenediamine and 0.1 mM MEH.

Figure 4:
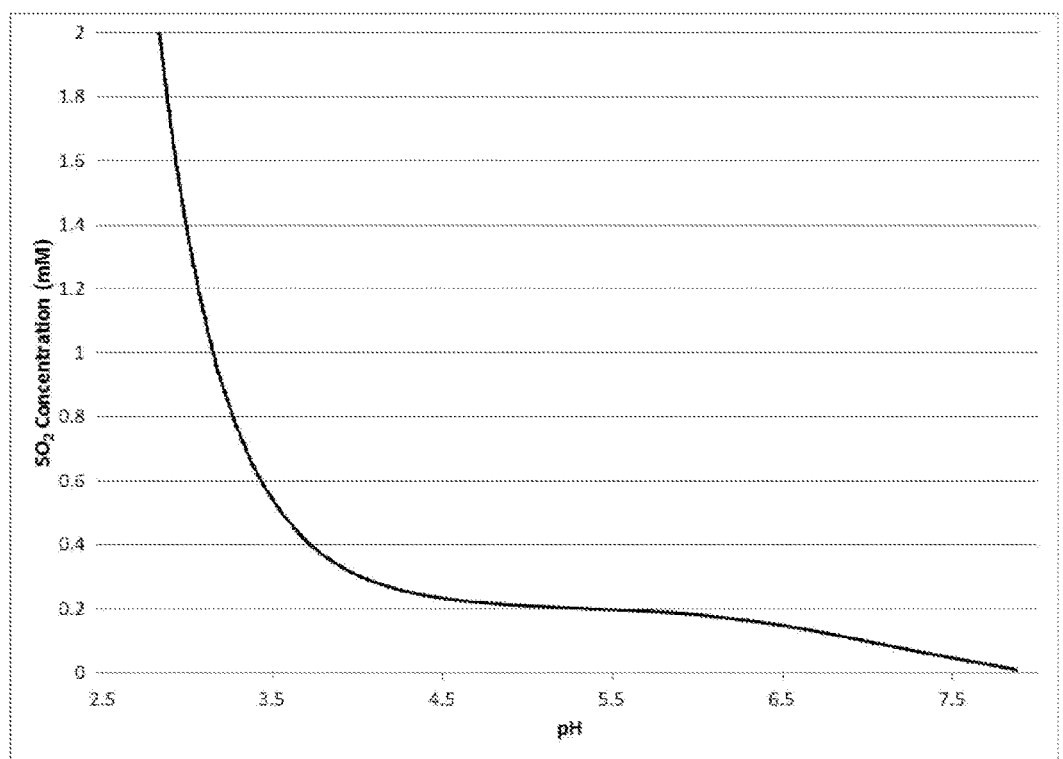
FIG. 4 is a graph illustrating the relationship between absorbent solution pH and $SO_2$ concentration.

The relationship between pH and $SO_2$ content of the absorbent was determined is and shown in FIG. 4. The relevant reactions for $SO_2$ are summarised in Goldberg, R. N., Parker, V. B. *Journal of the National Bureau of Standards*, 90 (1985), 341-390. The main difference between $SO_2$ and $CO_2$ is that the photoactive molecule needs to operate in a lower pH regime to achieve significant $SO_2$ removal from the gas stream.

Example 4

The requirement to select an amine for use with a photochromic molecule that results in an absorbent pH within the working range of the photochromic molecule can be illustrated by calculation. The $pK_a$ of MEH used in Example 2 is 7.8 in aqueous solution at room temperature. In its optically excited spiropyran form it becomes a strong acid ($pK_a$<1). The pH of a mixture containing 0.5 M amine and 0.25 M MEH (ground state) as a function of absorbed $CO_2$ and 0.5 M amine and 0.25 spiropyran (excited state) as function of absorbed $CO_2$ was calculated using the published this amine with a MEH/spiropyran system, more $CO_2$ will be removed upon excitation than when using piperidine as the absorbent amine.

Example 5

This example is identical to Example 4 except that the photoactive molecule is now 1-(2-nitroethyl)-2-naphthol which has a $pK_a$ of 9.7 in the ground state and 1.9 in the excited state. In this case piperidine is a better match for the operating pH range of the nitronapthol, compared to the MEH/spiropyran given in Example 4. The nitronapthol also extends the pH range over which $CO_2$ removal could be achieved using monoethanolamine.

Figure 7:
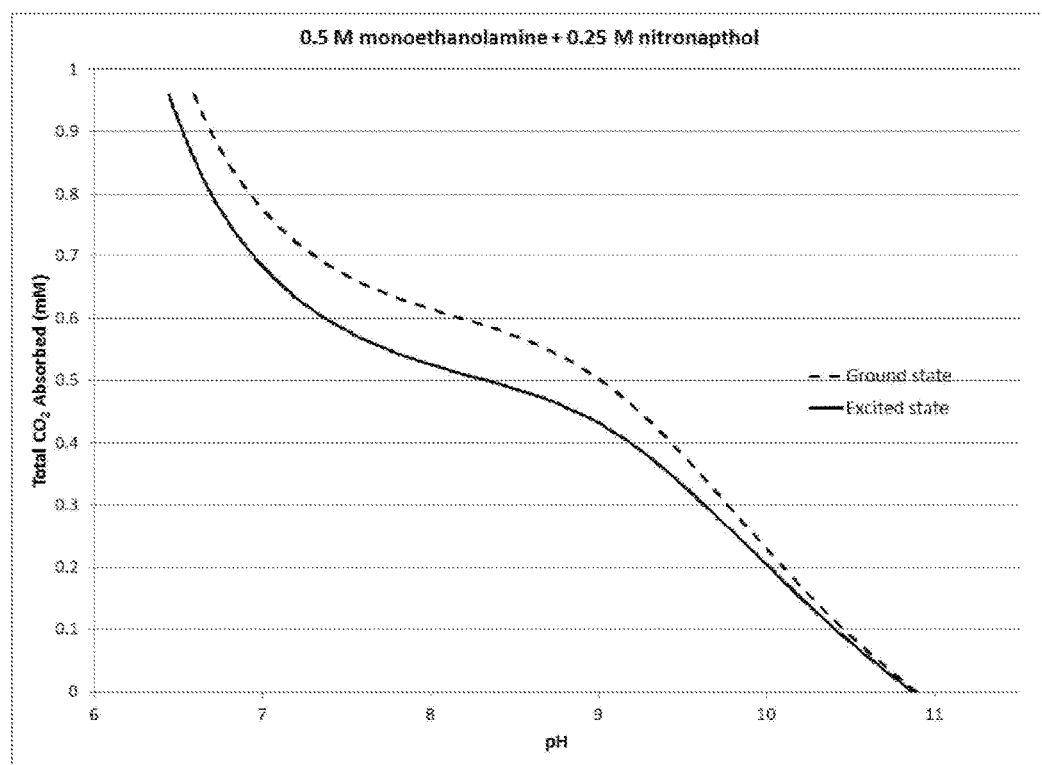
FIG. 7 is a graph illustrating the relationship between $CO_2$ absorption and pH by an absorbent solution containing monoethanolamine and nitronaphthol photoactive compound in the ground state and the excited state in accordance with an embodiment of the present invention.
Figure 8:
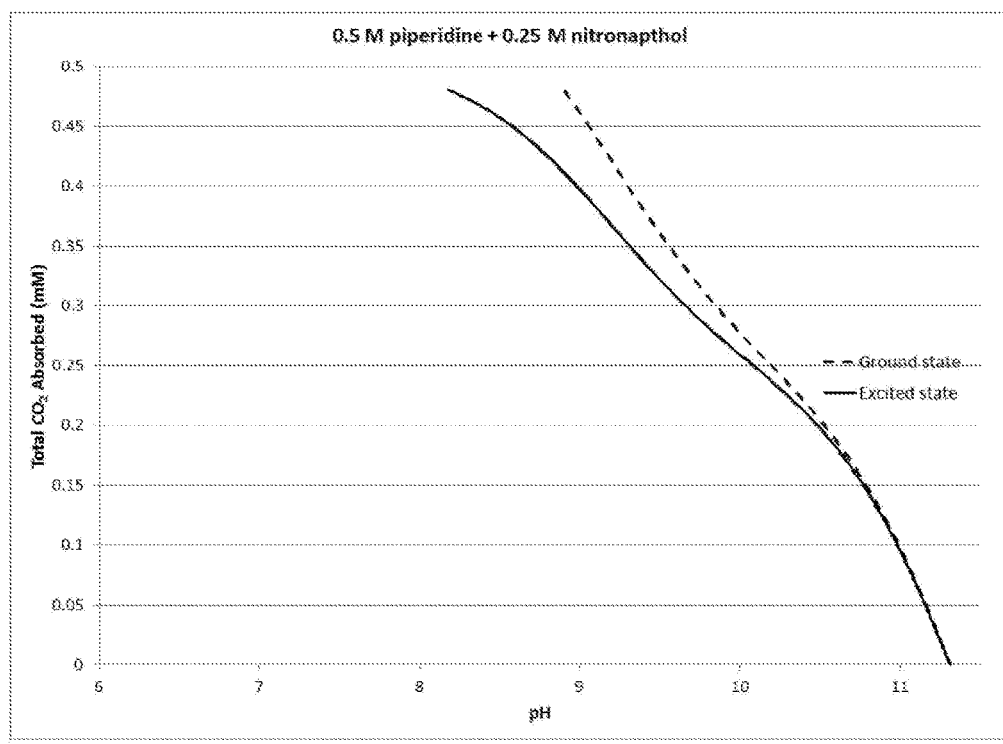
FIG. 8 is a graph illustrating the relationship between $CO_2$ absorption and pH by an absorbent solution containing piperidine and nitronaphthol photoactive compound in the ground state and the excited state in accordance with an embodiment of the present invention.

The results of calculated $CO_2$ absorption for absorbent solutions containing 0.25M nitronaphthol and either monoethanolamine and piperidine is shown in FIGS. 7 and 8, respectively.

Example 6

Figure 9:
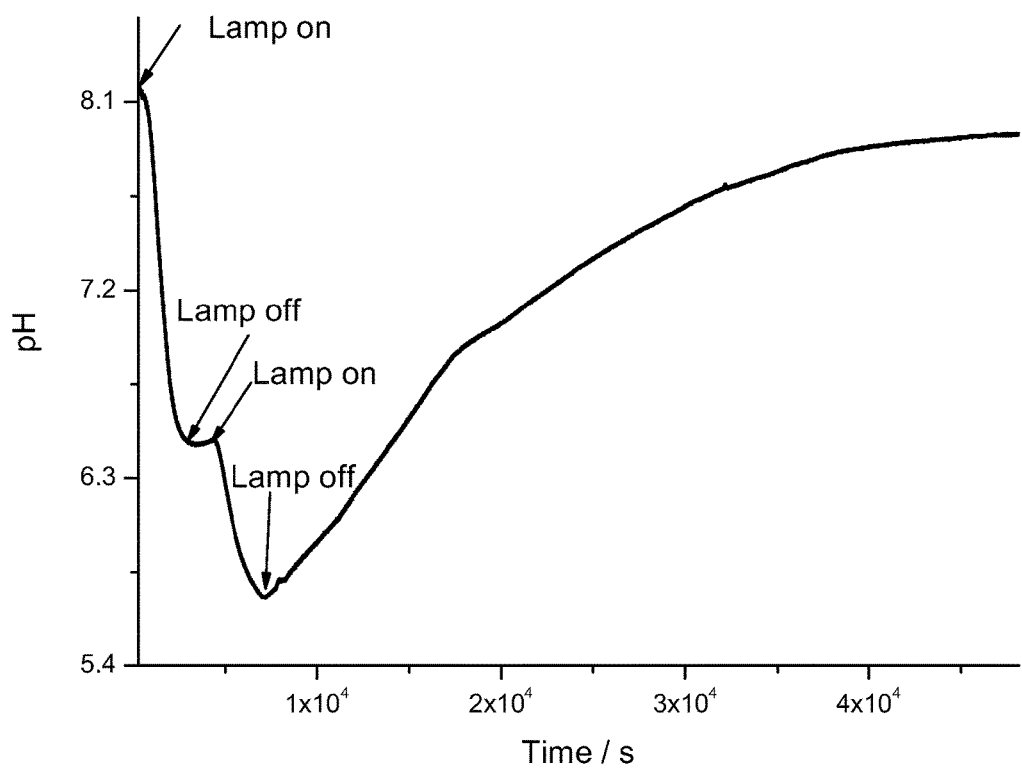
FIG. 9 is a graph illustrating the relationship between pH and 1-(2-nitroethyl)-2-naphthol in either its ground or excited state as measured using a pH probe.

To demonstrate the reversibility of the pH switching behaviour, a 1 mM solution of 1-(2-nitroethyl)-2-naphthol in 2% methanol aqueous solution was irradiated with a 500 W Xe/Hg lamp to simulate solar irradiation and the pH monitored with an electrode. The results are shown in FIG. 9. The operating range available for this molecule and those of other photoacids in this class extends to more basic (higher) pH than that of the merocyanine MEH. This means that more amines are available for use alongside this photoacid such as both piperidine and monoethanolamine.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A process for removing a target acidic gas from a gas stream rich in the target gas, comprising:
   contacting the gas stream with an absorbent solution comprising an amine selected from primary, secondary, or tertiary amines, alkanolamines, amino acids, and mixtures thereof, in which the target gas is soluble to form a target gas rich absorbent solution and a gas stream that is lean in the target gas; and
   converting a photoactive compound in the gas rich absorbent solution from a first state to a second state to bring about a reduction in pH of the absorbent solution wherein the gas rich absorbent solution comprising the photoactive compound in the first state has a higher absorption capacity for the target acid gas than the gas rich solution with the photoactive compound in the second state to cause desorption of the target gas from the absorbent solution comprising the target gas.

2. A process according to claim 1, wherein the amine is selected from the group consisting of monoethanolamine, ethylenediamine, 2-amino-2-methyl-ethanolamine and benzylamine, N-methylethanolamine, piperazine, piperidine and substituted piperidine, and diethanolamine, N-methyldiethanolamine, taurine, sarcosine, and alanine.

3. A process according to claim 1, wherein the photoactive compound is selected from the group consisting of naphthols and protonated merocyanine ring opened form of spiropyrans.

4. A process according to claim 1, wherein the photoactive compound is 1-(2-nitroethyl)-2-naphthol.

5. The process according to claim 1, wherein the photoactive compound is a photochromic compound.

6. The process according to claim 1, wherein the step of converting the photoactive compound from the first state to the second state involves irradiation with light.

7. The process according to claim 6, further comprising adding the photoactive compound to the target gas rich solution prior to exposing the target gas rich solution to light.

8. The process of claim 7, wherein the step of contacting the gas stream with the absorbent solution includes exposing the absorbent solution to light.

9. The process according to claim 1, wherein the amine selected from primary, secondary or tertiary amines, alkanolamines, amino acids, and mixtures thereof is in an amount to provide an initial pH of from about 9 to about 12 prior to absorption of $CO_2$.

10. The process according to claim 9, wherein the pH of the absorbent solution falls within the operating range $pK_a$ of the photoactive compound, and wherein excitation of the photoactive compound provides a reduction in pH.

11. The process according to claim 1, wherein the converting of the photoactive compound from the first state to the second state comprises a change selected from the group consisting of: association or dissociation of moieties to or from the photoactive compound, a spatial rearrangement of at least a part of the compound, a steric change to the compound, forming or breaking bonds within the compound, ring formation, a change in the acid dissociation constant or base dissociation constant of at least a part of the compound, or a combination thereof.

12. The process according to claim 1, wherein the photoactive compound acts as a Brønsted base or weak Brønsted acid in the first state, and a strong Brønsted acid in the second state.

13. The process according to claim 1, wherein the conversion of the photoactive compound from the first state to the second state brings about a change in $pK_a$ of at least 1.

14. The process according to claim 1, wherein the gas rich absorbent solution comprises the photoactive compound in solution in a concentration of from about 0.1 mmol per liter of absorbent solution to 10 mol per liter of absorbent solution.

15. The process according to claim 1, wherein the photoactive compound includes at least one selected from the group consisting of spiropyrans, spirooxazines, dithienylethenes, fulgides, fulgimides, perimidinespirocyclohexadienones, quinones, benzodiazepines, naphthopyrans, dihydroindolines, protonated merocyanines, and naphthols.

16. The process according to claim 1, wherein the photoactive compound is a photoacid comprising a nucloeophilic moiety having a photodissociable proton, an electron accepting moiety, and a bridge between the nucleophilic and electron accepting moiety, wherein the electron accepting moiety bonds to a proton photodissociated from the nucleophilic moiety during reversible photoinduced intramolecular reaction to form a ring.

17. The process according to claim 1, wherein the target gas is selected from the group consisting of $CO_2$, $NO_x$ (where x is between 0.5 and 2), $SO_2$, $H_2S$, and halogen gas.

18. The process according claim 1, wherein the target gas is carbon dioxide.

19. A process according to claim 1, wherein the light used to convert the photoactive from the first state to the second state is sunlight.

20. A process for separating carbon dioxide from a gas mixture comprising:
   providing an absorbent solution comprising an amine selected from the group consisting of primary amines, secondary or tertiary amines, alkanolamines, amino acids and mixtures thereof, and a photoactive compound having a first state and a second state of higher $pK_a$ than the first state formed on irradiation with light, wherein the amine is present in an amount to provide a pH of the absorbent solution in the range of from 9 to 12;
   contacting the absorbent solution with a gas stream rich in carbon dioxide to absorb carbon dioxide and provide an absorbent solution rich in absorbed carbon dioxide and a gas stream lean in carbon dioxide;
   irradiating the absorbent solution rich in absorbed carbon dioxide to convert the photoactive compound from the first state to the second state and produce a reduction in pH of the absorbent solution rich in absorbed carbon dioxide and reduce the absorption capacity of the absorbent solution rich in absorbed carbon dioxide; and
   collecting carbon dioxide desorbed from the absorbent solution.

* * * * *